W. L. REIT.
SPRING SUSPENSION FOR AUTOMOBILES.
APPLICATION FILED JULY 31, 1920.
1,364,520.
Patented Jan. 4, 1921.
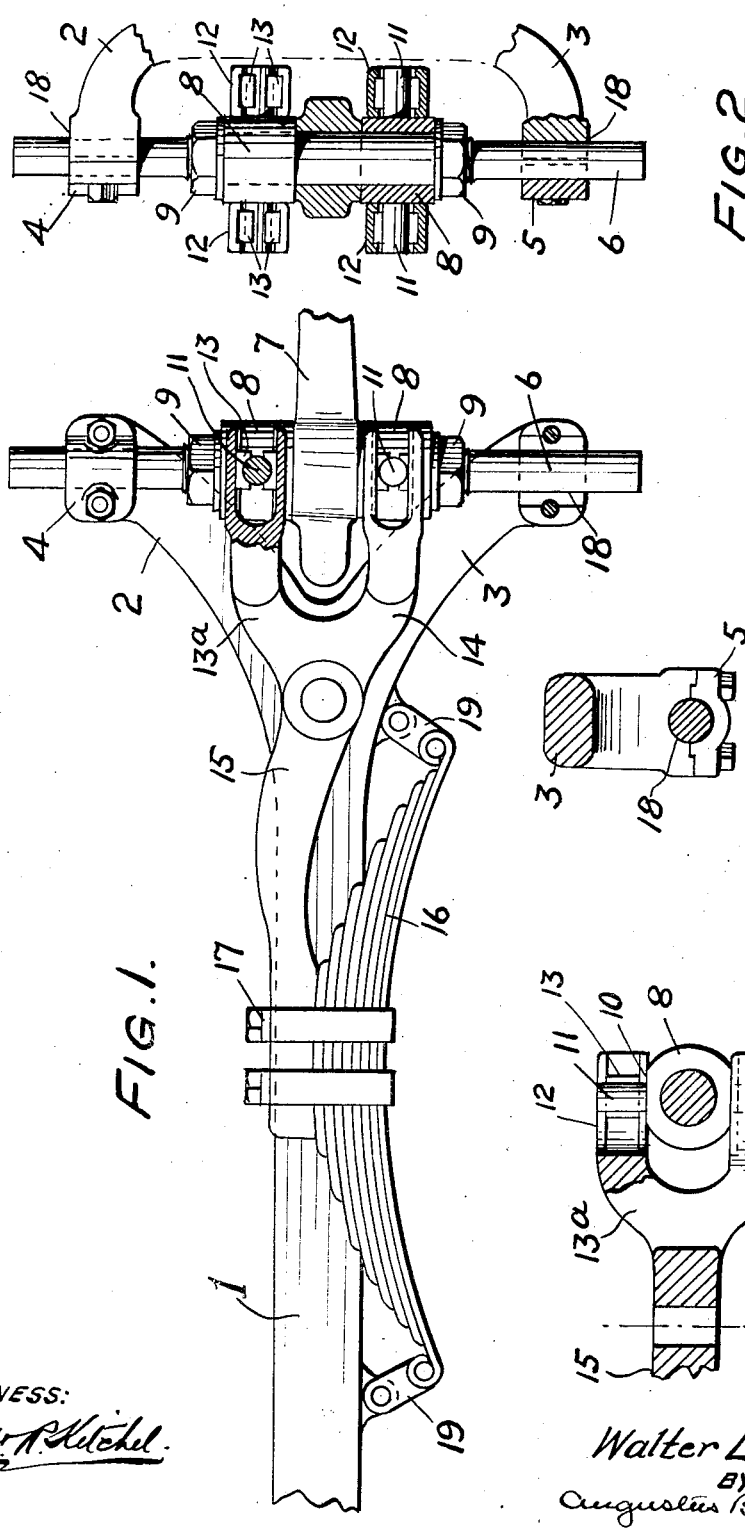
WITNESS:
INVENTOR
Walter L. Reit
BY
Augustus B. Stoughton

UNITED STATES PATENT OFFICE.

WALTER L. REIT, OF PHILADELPHIA, PENNSYLVANIA.

SPRING SUSPENSION FOR AUTOMOBILES.

1,364,520.      Specification of Letters Patent.      Patented Jan. 4, 1921.

Application filed July 31, 1920. Serial No. 400,459.

*To all whom it may concern:*

Be it known that I, WALTER L. REIT, a citizen of Germany, residing at Philadelphia, in the county of Philadelphia and State of Pennsylvania, have invented certain new and useful Improvements in Spring Suspensions for Automobiles, of which the following is a specification.

The principal objects of the present invention are, first, to afford each of the steering wheels a range of spring movement independently of the other; second, to improve the steering qualities of an automobile or car; third, to cause the car to hug the road even when the latter is extremely crowned; and fourth, to provide an improved spring suspension or support for the front axle in respect to the steering wheels.

The invention will be claimed at the end hereof but will be first described in connection with the embodiment of it chosen for illustration in the accompanying drawings forming part hereof and in which—

Figure 1, is an elevational view, with parts broken away, of a portion of an axle embodying features of the invention.

Fig. 2, is a transverse sectional view of the same.

Fig. 3, is a view, drawn to an enlarged scale, of one of the forks with parts broken away, and Fig. 4, is a horizontal sectional view through one of the keepers.

In the drawings 1, is an axle having at each of its ends, or more accurately at end branches 2 and 3, vertically alined keepers 4 and 5. 6, is a spindle endwise movable and turnable about a vertical axis in the bearings 18, provided by the keepers, and it carries rigidly a steering wheel spud-axle 7. 8, are duplicate sleeves in which the spindle 6, is turnable, but not endwise movable, and one of them is arranged above and the other below the spud axle 7, and they are held in place as by nuts 9. Each sleeve is provided with flats 10, from which project pins 11. Forks 12, or more accurately, sliding bearing blocks 13 arranged therein, engage the pins 11, and these forks are provided on the arms 13ª and 14, of the split-end of a lever 15, pivoted to the axle 1, and spring pressed or supported by the half elliptical leaf spring 16, connected with the lever by attaching means 17, and with the axle 1, by shackles 19.

In use the spindle 6, may be turned in the sleeves 8, and bearings 18, to steer, and each spud axle 7, may move up and down in the bearings 18, independently of the other spud axle, and such up and down movement is provided for and controlled by the spring 16, and in this way the objects of the invention are attained.

Obviously modifications may be made in details of construction and arrangement without departing from the spirit of the invention, which is not limited as to such matters or otherwise than as the appended claims and prior art may require.

I claim:

1. An individual spring suspension or support for the steering wheels of automobiles or cars comprising the combination of an axle, a spindle carrying a spud axle and vertically movable and turnable about a vertical axis in bearings provided on the axle, a lever pivoted to the axle and having one end in engagement with the spindle, and a spring interposed between the other end of the lever and the axle, substantially as described.

2. An individual spring suspension or support for the steering wheels of automobiles or cars comprising the combination of an axle having at its ends branches each provided with vertically alined bearings, a spindle arranged in said bearings and provided with a spud-axle, sleeves provided with pins and arranged above and below the spud-axle and turnably secured to the spindle against endwise movement, a lever pivoted to the axle and having a split end of which the arms are provided with forks having movable bearing-blocks engaging said pins, and a leaf-spring interposed between the axle and lever, substantially as described.

WALTER L. REIT.